United States Patent
Wen et al.

(10) Patent No.: US 12,422,389 B2
(45) Date of Patent: Sep. 23, 2025

(54) STAR INFILTRATION DEVICE, AND METHOD OF MEASURING GRAVITATIONAL ACCELERATION AND SOIL-BEARING CAPACITY OF A STAR

(71) Applicant: Northwest Institute of Eco-Environment and Resources, Chinese Academy of Sciences, Gansu (CN)

(72) Inventors: Zhi Wen, Gansu (CN); Yasheng Li, Gansu (CN); Xixi Ma, Gansu (CN); Qiang Gao, Gansu (CN)

(73) Assignee: Northwest Institute of Eco-Environment and Resources, Chinese Academy of Sciences, Gansu (CN)

( * ) Notice: Subject to any disclaimer, the term of this patent is extended or adjusted under 35 U.S.C. 154(b) by 0 days.

(21) Appl. No.: 18/806,663

(22) Filed: Aug. 15, 2024

(65) Prior Publication Data
US 2025/0155393 A1    May 15, 2025

(30) Foreign Application Priority Data
Nov. 14, 2023    (CN) .......................... 202311512907.1

(51) Int. Cl.
*G01N 25/20*    (2006.01)
*B64G 1/10*    (2006.01)
(Continued)

(52) U.S. Cl.
CPC ............. *G01N 25/20* (2013.01); *G01N 3/317* (2013.01); *G01P 15/003* (2013.01); *G01V 7/14* (2013.01); *B64G 1/1071* (2023.08)

(58) Field of Classification Search
CPC ...... G01N 25/20; G01N 3/317; G01P 15/003; G01V 7/14
See application file for complete search history.

(56) References Cited

U.S. PATENT DOCUMENTS

| | | | | |
|---|---|---|---|---|
| 4,845,978 A * | 7/1989 | Whitford | ............... | G01N 25/18 73/75 |
| 5,795,991 A * | 8/1998 | Hesse | ....................... | E21B 7/06 73/12.09 |
| 11,029,436 B2 * | 6/2021 | Kiss | ..................... | G01N 33/245 |

FOREIGN PATENT DOCUMENTS

| | | |
|---|---|---|
| CH | 133870 A | 6/1929 |
| CN | 103419945 A | 12/2013 |

(Continued)

OTHER PUBLICATIONS

Shen, Yi et al.: "Research on Impact Type Penetrator for Lunar Regolith Exploration Project", Journal of Deep Space Exploration, vol. 2, No. 3, Sep. 2015 DOI: 10.15982/j.issn.2095-7777.2015.03.004.

*Primary Examiner* — Helen C Kwok
(74) *Attorney, Agent, or Firm* — CKC & Partners Co., LLC

(57) ABSTRACT

A star infiltration device and method of measuring the gravitational acceleration and soil-bearing capacity of a star are provided. The infiltration device is multifunctional and has a variable ramming frequency intensity. It comprises an infiltrator in which a rammer is driven by solenoid coils to move up and down in a conducting pipe to cause the infiltrator to penetrate a layer of star soil. Planetary gravitational acceleration is measured while the infiltrator is in the penetration state, star soil softness is evaluated during the penetration process, and star soil thermal parameters and temperature fluctuations are measured after penetration.

7 Claims, 7 Drawing Sheets

(51) Int. Cl.
    *G01N 3/317*     (2006.01)
    *G01P 15/00*     (2006.01)
    *G01V 7/14*     (2006.01)

(56) References Cited

FOREIGN PATENT DOCUMENTS

| | | | |
|---|---|---|---|
| CN | 103419946 A | 12/2013 | |
| CN | 107826272 A | 3/2018 | |
| CN | 114232584 A | 3/2022 | |
| CN | 114483022 A | 5/2022 | |
| CN | 219224376 U | 6/2023 | |
| DE | 102011001153 A1 * | 9/2012 | ............. E02D 1/022 |
| GB | 190523075 A | 3/1906 | |

* cited by examiner

STAR INFILTRATION DEVICE, AND METHOD OF MEASURING GRAVITATIONAL ACCELERATION AND SOIL-BEARING CAPACITY OF A STAR

CROSS-REFERENCE TO RELATED APPLICATIONS

This non-provisional application claims priority under 35 U.S.C. § 119 (a) to patent application No. 202311512907.1 filed in P.R. China on Nov. 14, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of this application and is not an admission that any such reference is "prior art" to the application described herein. All references listed, cited and/or discussed in this specification are incorporated herein by reference in their entirety and to the same extent as if each reference was individually incorporated by reference.

FIELD OF THE INVENTION

The present invention belongs to the technical field of planetary exploration, and particularly relates to a star infiltration device and method for measuring the gravitational acceleration and the soil-bearing capacity of a star.

BACKGROUND OF THE INVENTION

With the expansion of human activities into interstellar space, planetary exploration is no longer limited to planetary remote sensing, and deeper knowledge can be gained by landing space probes on the planetary surface and exploring the mechanical and thermal properties of the star soil in relevant regions. Specifically, this operation involves integrating relevant sensors on a rod-shaped object and inserting it into the star soil layer to conduct scientific exploration. Varying planetary masses and complex geological histories of planetary surfaces have resulted in complex and varying degrees of compaction of the soil layer deposited on the planetary surface. For the same ramming force, the reaction force of the star soil on an infiltrator is also variable. NASA's Mars probe attachment, "Mole", used a compressed spring that was rotated by a motor to provide the power for the "Mole" to enter the Martian soil by means of rammer strikes, but this had the disadvantage that the force of each rammer strike could not be adjusted, and this was also one of the main reasons for the failure of the "Mole" mission. During the "Mole" drilling process, it will be possible to penetrate deeper into the Martian soil layer to determine more parameters, such as Martian soil temperature, Martian soil thermal parameters and Martian seismicity, if the ramming force can be adjusted according to the softness of the star soil. At present, infiltrators of the impact penetration type also suffer from the disadvantage of having a constant and unchangeable ramming force. As described in patents ZL201711037330.8, ZL201310386946.1 and ZL201310387276.5, penetration-type infiltrators mostly rely on gravitational acceleration on the planetary surface to provide power to the rammer or use compressed springs as the driving force, so that the corresponding force is in a single form. Due to the complexity of the star soil's geological history and the planetary gravitational acceleration, the softness of the star soil layer is variable. Therefore, to ensure that an infiltrator can successfully penetrate under different conditions of planetary gravitational acceleration and star soil compactness, it is necessary to make both the ramming force and the frequency of the infiltrator adjustable.

In engineering practice, dynamic penetration is often used to determine the bearing capacity of a geotechnical body. Specifically, the same ramming force is applied to an infiltration device and the number of rammer strikes required to penetrate the same depth in a geotechnical body is recorded, so that the bearing capacity of the geotechnical body at different depths can ultimately be determined by the number of rammer strikes. In planetary exploration activities, in-situ measurement of star soil-bearing capacity is of great significance, mainly including the following points: (1) in-situ measurement of star soil-bearing capacity can indirectly infer the sedimentary history of near-surface soils on the star surface, thereby providing data for studying the geological history of the star soil; (2) provide surveys for core sampling of a planetary probe and data references for core drilling research; and (3) provide geological survey data for the design, construction and operation of planetary bases, and guide the construction and operation of planetary bases.

Integrating relevant sensors into the infiltrator allows more diverse star soil data to be tested, e.g. data related to star soil mineralogical composition, star soil temperature, planetary seismicity, and star soil thermal parameters, etc., all of which depend on the successful penetration of the infiltrator into the star soil layer.

SUMMARY OF THE INVENTION

The present invention provides a start soil infiltration device with variable ramming frequency and intensity. This device can meet the engineering requirements for a planetary probe to successfully enter the star soil layer. Compared to using the gravity of an object as a driving force or using a compressed spring as a driving force, the present invention controls the current direction and current value of the solenoid coil to enable the rammer to operate at different movement velocities and ramming frequencies so that the infiltration device can enter the star soil under different conditions. The infiltration device of the present invention is equipped with a star soil temperature sensor and a star soil thermal parameter tester. In addition, the planetary gravitational acceleration value can be derived from a free-fall experiment using a rammer, and the star soil-bearing capacity at different depths can be evaluated by the ramming force and ramming number of the rammer.

The technical solutions adopted in the present invention are as follows.

A star infiltration device comprising an infiltrator, a rammer being provided inside the infiltrator, characterized in that the infiltrator sequentially comprises, in order from bottom to top, an infiltrator cone part, an infiltrator tip, an infiltrator power part and an upper plug; a conducting pipe is provided inside the infiltrator, and the rammer is disposed in the inner part of the conducting pipe, a ramming surface is provided at the bottom of the conducting pipe inside the infiltrator tip, and a lifting coil is provided in the inner part of the infiltrator tip; the distance from the lower end face of the lifting coil to the lowest point of the ramming surface in the inner part of the infiltrator tip is one-half of the rammer length, and accelerating coil and a positioning coil are provided in the inner part of the infiltrator power part in an order from bottom to top, wherein the accelerating coil comprises a plurality of groups, and the distance from the upper outlet end of the positioning coil to the cushion is one-half of the rammer length; the lifting coil, the accelerating coil and the positioning coil are all disposed on the outside of the conducting pipe; a position sensor I for detecting the position of the rammer is provided in both the central part of the lifting coil, the positioning coil and each accelerating coil, a position sensor II for detecting the position of the rammer is provided at a position above the ramming surface inside the infiltrator tip, and a position sensor III for detecting the position of the rammer is provided at a position at the upper outlet end of the positioning coil.

In one embodiment, the accelerating coil comprises a first accelerating coil, a second accelerating coil, a third accelerating coil and a fourth accelerating coil.

In one embodiment, the infiltrator is connected to an infiltrator bracket, the infiltrator bracket comprises three legs, a limiting sleeve, a bracket flange and a leveling ring; the legs are fixed to the lower part of the bracket flange, the bracket flange and the leveling ring are connected to each other by a first group of two leveling shafts on the same axis, the limiting sleeve is provided with a limiting ring at its upper end, and the leveling ring is connected to the limiting ring by a second group of leveling shafts; the axial direction of the second group of leveling shafts is in a direction perpendicular to the axis of the first group of leveling shafts; the infiltrator is arranged in the limiting sleeve, and a plurality of limiting reeds are provided in the limiting sleeve, which are provided at equal intervals along the circumferential and axial directions of the limiting sleeve; a bearing is provided at the end of the limiting reeds, and a limiting groove used for setting the bearing is provided outside the infiltrator, while the bearing is disposed inside the limiting groove at a corresponding position.

In one embodiment, a plurality group of displacement solenoid coils are provided at the lower part of the limiting sleeve, and the outer surface of the infiltrator power part is an armature tube made of soft magnetic material, which forms a differential displacement sensor together with the plurality group of solenoid coils in the limiting sleeve.

In one embodiment, a thermocouple temperature sensor is provided outside the infiltrator, and a star soil thermal parameter tester is provided at the infiltrator tip; the central part of the star soil thermal parameter tester is a circular heat generating plate equipped with a thermocouple temperature sensor, and the surrounding area is a circular heat receiving plate equipped with a plurality of thermocouple temperature sensors.

In another embodiment, position sensor I, position sensor II and position sensor III are all infrared sensors comprising an infrared transmitting tube and an infrared receiving tube.

In a further embodiment, a groove structure is provided in the inner part of the conducting pipe.

A method of measuring the gravitational acceleration of a star, wherein measuring the gravitational acceleration of a star with the above-mentioned star infiltration device comprises the steps of step a: after the star infiltration device is placed on the star, lifting the rammer in a bottomed-out state into the positioning coil; specifically, applying a current to the lifting coil to move the rammer upward, wherein when the position sensor I in the middle of the lifting coil is triggered, turning off the current in the lifting coil and turning on the current in the first accelerating coil, at which time the rammer approaches the first accelerating coil and continues to move upward, when the position sensor I in the middle of the first accelerating coil is triggered, turning off the current in the first accelerating coil and turning on the current in the second accelerating coil, at which time the rammer approaches the second accelerating coil and moves upward, when the position sensor I in the middle of the second accelerating coil is triggered, turning off the current in the second accelerating coil and turning on the current in the third accelerating coil, at which time the rammer approaches the third accelerating coil and moves upward, when the position sensor I in the middle of the third accelerating coil is triggered, turning off the current in the third accelerating coil and turning on the current in the fourth accelerating coil, at which time the rammer approaches the fourth accelerating coil and moves upward, when the position sensor I in the middle of the fourth accelerating coil is triggered, turning off the current in the fourth accelerating coil, at which time the rammer approaches the positioning coil, when the position sensor I in the middle of the positioning coil is triggered, applying a current to the positioning coil, so that finally the rammer is stationary in the positioning coil and the position sensor III at the upper outlet end of the positioning coil is triggered; and step b: turning off the current in the positioning coil and refraining from applying current to the fourth, third, second, first accelerating coil and the lifting coil so as to cause the rammer to undergo a free-fall motion, at which time the end time of the period during which the position sensor III at the upper outlet end of the positioning coil is triggered and the end time of the period during which the position sensor I in the middle of the lifting coil is triggered are recorded, thereby calculating the time of the rammer's free-fall motion and recording it as t, since the movement displacement h of the rammer from the positioning coil to the bottoming out is constant, Equation $$h = v_0 t + \frac{1}{2} g t^2$$

is obtained in which v0 is the initial velocity of the rammer and v0=0 in the measurement, thus the gravitational acceleration is calculated by Equation $$g = \frac{2h}{t^2}.$$

A method of measuring the soil-bearing capacity of a star, wherein measuring the soil-bearing capacity of a star with the above-mentioned star infiltration device comprises the steps of step 1: placing the infiltrator bracket equipped with the infiltrator on the planetary surface, once the infiltrator is stationary, measuring the gravitational acceleration by the above method of measuring the gravitational acceleration of a star;

step 2: lifting the rammer to the positioning coil again, releasing the rammer, and sequentially applying current to the fourth, third, second and first accelerating coil and the lifting coil in accordance with the measured value of the gravitational acceleration to accelerate the downward movement of the rammer, and finally causing the rammer to strike the ramming surface to allow the infiltrator to move downward, wherein when the rammer strikes the ramming surface, the bearing at the end of the limiting reed is disengaged from the limiting groove and the infiltrator cone part at the lower end of the infiltrator comes into contact with the star soil to be measured;

step 3: continuously lifting the rammer to the positioning coil, controlling the rammer to accelerate downward to strike the ramming surface, and recording the time at which the rammer triggers the position sensor I in the middle of the lifting coil and the time at which the position sensor II at a position above the ramming surface is triggered to calculate an end movement velocity v of the rammer before striking, so that the impact energy of the rammer with a mass m is obtained as shown in $$W = \frac{1}{2}mv^2;$$

then measuring and recording the displacement l corresponding to each striking action using a differential displacement sensor composed of an armature tube made of soft magnetic material on the outer surface of the infiltrator power part and a plurality group of displacement solenoid coils in the limiting sleeve; and step 4: repeating step 3 and plotting the relationship curve between the impact energy and the displacement for each rammer, then calculating the dynamic penetration resistance of a star soil by Equation $$q_d = \frac{mv^2}{2Al}$$

where $q_d$ is the value of the dynamic penetration resistance, m is the mass of the rammer, v is the end movement velocity of the rammer, A is the cross-sectional area of the infiltrator tip, and l is the displacement of the infiltrator penetrating the star soil corresponding to each strike, thereby determining and evaluating the subgrade bearing performance of the star soil.

BRIEF DESCRIPTION OF THE DRAWINGS

The following drawings are provided for illustrative purposes only and merely depict exemplary embodiments of the disclosure. These drawings are provided to facilitate the reader's understanding of the disclosure and should not be considered as limiting to the breadth, scope, or applicability of the disclosure. It should be noted that these drawings are not necessarily drawn to scale for clarity and ease of illustration.

DETAILED DESCRIPTION OF THE EXEMPLARY EMBODIMENT

The present invention will be described in more detail below with reference to the accompanying drawings and examples in order to make the objects, technical solutions, and advantages of the present invention clearer and more intelligible.

FIGS. 1 to 7 illustrate exemplary embodiments of the present invention.

Figure 1:
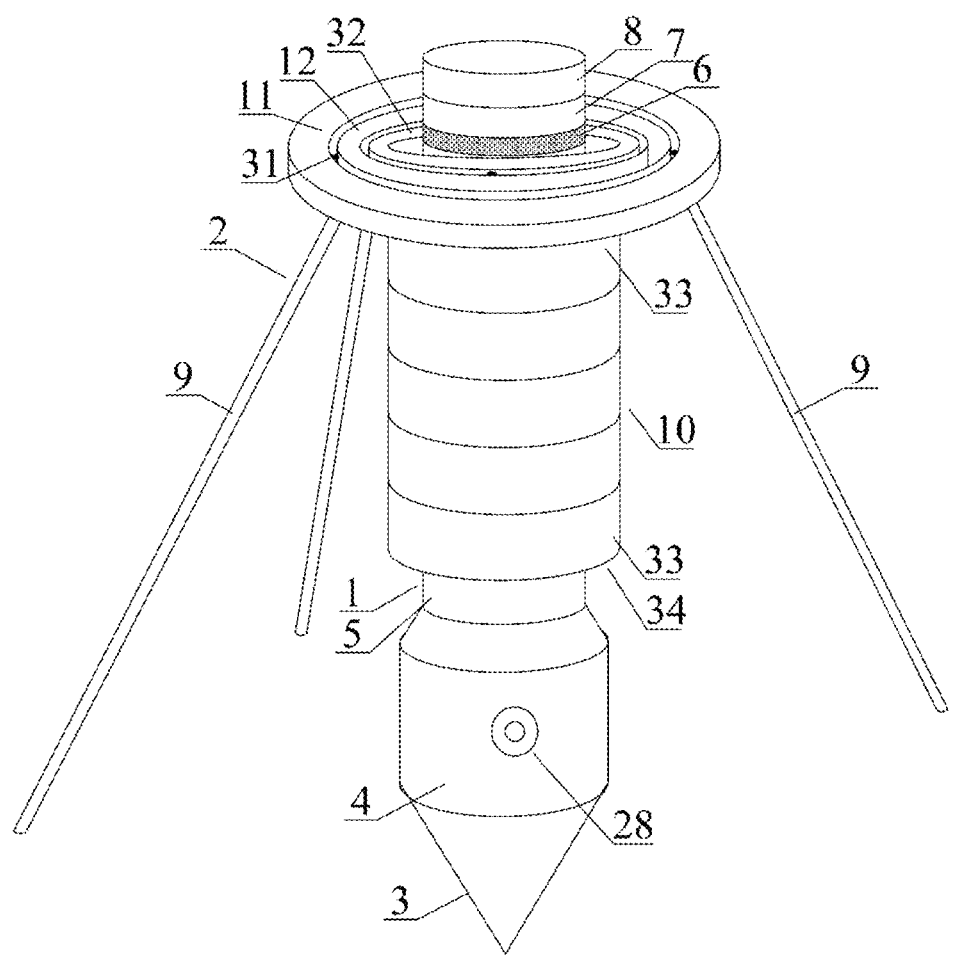
FIG. 1 illustrates the effect of the use of the present invention.
Figure 2:
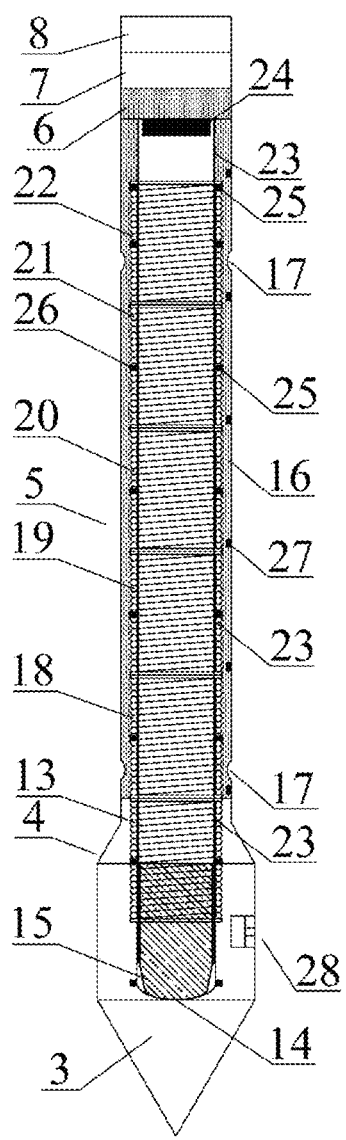
FIG. 2 is a detailed diagram of various parts of the infiltrator.
Figure 3:
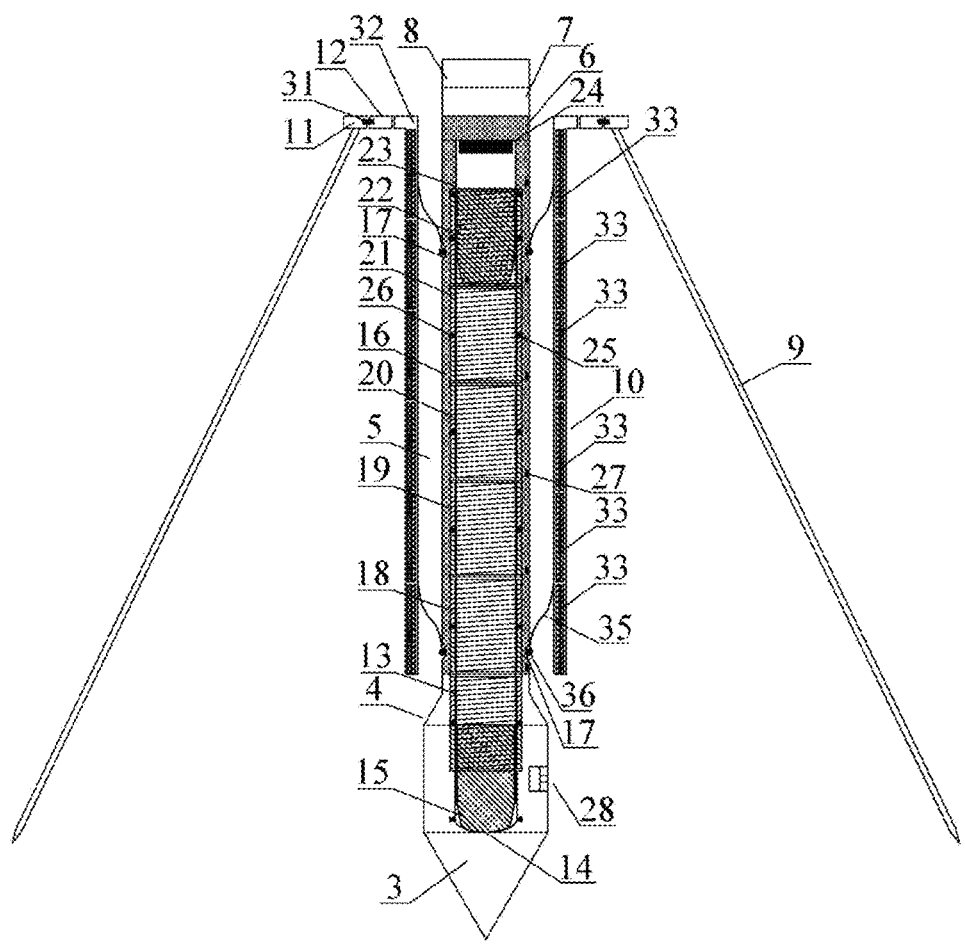
FIG. 3 is a detailed diagram of various parts of the infiltrator when mounted on an infiltrator bracket.
Figure 5:
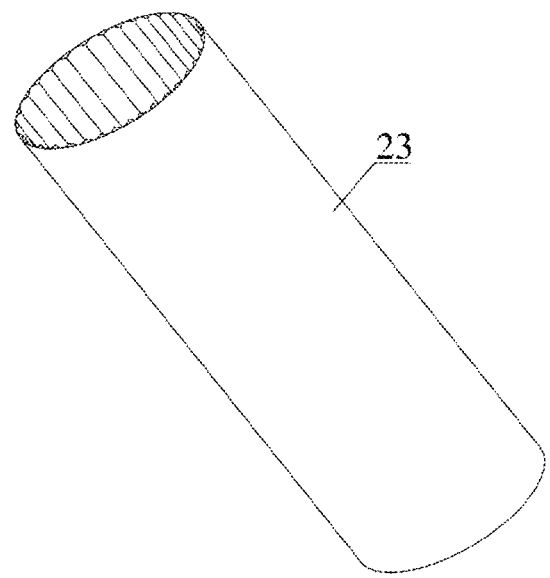
FIG. 5 is a detailed diagram of the guide pipe.

As shown in FIGS. 1 to 3, a star infiltration device comprises an infiltrator 1, a rammer 15 is provided inside the infiltrator 1, and the infiltrator 1 sequentially comprises, in order from bottom to top, an infiltrator cone part 3, an infiltrator tip 4, an infiltrator power part 5 and an upper plug 6. A conducting pipe 23 as shown in FIG. 5 is provided in the infiltrator 1, and the rammer 15 is disposed in the inner part of the conducting pipe 23; a ramming surface 14 is provided at the bottom of the conducting pipe 23 inside the infiltrator tip 4, and a lifting coil 13 is provided in the inner part of the infiltrator tip 4. The distance from the lower end face of the lifting coil 13 to the lowest point of the ramming surface 14 in the inner part of the infiltrator tip 4 is one-half of the length of the rammer 15, and accelerating coil and a positioning coil 22 are provided in the inner part of the infiltrator power part 5 in order from bottom to top. The accelerating coil comprises a plurality of groups, and the distance from the upper outlet end of the positioning coil 22 to the cushion 24 is one-half of the length of the rammer 15; the lifting coil 13, the accelerating coil and the positioning coil 22 are all disposed on the outside of the conducting pipe 23. A position sensor I for detecting the position of the rammer 15 is provided in both the central part of the lifting coil 13, the positioning coil 22 and each accelerating coil, a position sensor II for detecting the position of the rammer 15 is provided at a position above the ramming surface 14 inside the infiltrator tip 4, and a position sensor III for detecting the position of the rammer 15 is provided at a position at the upper outlet end of the positioning coil 22.

The accelerating coil comprises a first accelerating coil 18, a second accelerating coil 19, a third accelerating coil 20 and a fourth accelerating coil 21. The infiltrator 1 is connected to an infiltrator bracket 2, and the infiltrator bracket 2 comprises three legs 9, a limiting sleeve 10, a bracket flange 11 and a leveling ring 12. The legs 9 are fixed to the lower part of the bracket flange 11, the bracket flange 11 and the leveling ring 12 are connected to each other by a first group of two leveling shafts 31 on the same axis, the limiting sleeve 10 is provided with a limiting ring 32 at its upper end, and the leveling ring 12 is connected to the limiting ring 32 by a second group of leveling shafts. The axial direction of the second group of leveling shafts is in a direction perpendicular to the axis of the first group of leveling shafts 31, the infiltrator 1 is disposed in the limiting sleeve 10, and a plurality of limiting reeds 35 are provided in the limiting sleeve 10, which are provided at equal intervals along the circumferential and axial directions of the limiting sleeve 10. A bearing 36 is provided at the end of the limiting reed 35, and a limiting groove 17 used for setting the bearing 36 is provided outside the infiltrator 1, while the bearing 36 is disposed inside the limiting groove 17 at a corresponding position.

Figure 4:
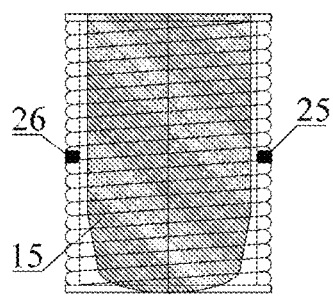
FIG. 4 is a schematic diagram of the rammer and the coil provided with an infrared transmitting tube and an infrared receiving tube in the middle thereof.

By providing a lifting coil 13 inside the infiltrator tip 4, the distance from the lower end face of the lifting coil 13 to the lowest point of the spherical ramming surface 14 inside the infiltrator tip 4 is one-half of the length of the rammer 15. As shown in FIG. 4, the rammer 15 has a flat upper end and a spherical ramming end at its lower end, and the rammer 15 moves downwardly from a higher position to ultimately strike the ramming surface 14 inside the infiltrator tip 4, causing the infiltrator 1 to penetrate the star soil. Position sensors I, II and III are all infrared sensors, each of which includes an infrared transmitting tube 25 and an infrared receiving tube 26. As shown in FIG. 5, a groove structure is provided in the inner part of the conducting pipe 23, which can reduce the moving resistance of the rammer 15. Position sensors I, II and III and a rammer driving circuit 7 for controlling the turning on and off of the lifting coil, the accelerating coil, and the positioning coil are all connected to a PLC-based automatic control system to achieve automatic control. The sensor driving circuit 8 is a circuit that measures the real-time resistance of the thermocouple temperature sensor 27 disposed on the lateral side of the infiltrator power part 5 and the thermocouple temperature sensor 27 in the star soil thermal parameter tester 28.

The main body of the infiltrator power part 5 is an armature tube 16 made of soft magnetic material coated with polyether ether ketone (PEEK) on its surface, wherein two limiting grooves 17 with a semi-elliptical cross section are provided on the outer surface, and inside of which, in order from bottom to top, a first accelerating coil 18, a second accelerating coil 19, a third accelerating coil 20, a fourth accelerating coil 21, and a positioning coil 22 are provided. Furthermore, a conducting pipe 23 having a groove made of wear-resistant UHMWPE ultra-high molecular weight polyethylene material is provided in the inner part of said coils, so that the rammer 15 moves inside the conducting pipe 23 under the electromagnetic force of said coils. A cushion 24 with elasticity is provided at the lower part of the upper plug 6 to cope with the impact of the rammer 15 on the upper plug 6 when the rammer 15 oscillates inside the positioning coil 22, and the distance from the upper outlet end of the positioning coil 22 to the cushion 24 is one-half of the length of the rammer 15. The inner part of the conducting pipe 23 where the rammer 15 is disposed is in a vacuum state, and the groove structure in the inner part of the conducting pipe 23 can effectively reduce the frictional resistance against the rammer 15. In the present invention, the ramming force and frequency of the rammer are all changeable so that it can successfully penetrate a star soil with various degrees of softness. Specifically, by controlling the current strength of the accelerating coil, the velocity of the rammer can be controlled to achieve the control of the ramming force; by controlling the current flow of the positioning coil, the rammer can be controlled to fall at a predetermined time, thereby achieving the control of the ramming frequency of the rammer.

To monitor the position of the rammer 15 so as to control the corresponding coil circuit to be turned on and off, a group of infrared transmitting tube 25 and infrared receiving tube 26 is provided in the central part of each of the lifting coil 13, the first accelerating coil 18, the second accelerating coil 19, the third accelerating coil 20, the fourth accelerating coil 21 and the positioning coil 22. Furthermore, a group of infrared transmitting tube 25 and infrared receiving tube 26 is also provided at a position slightly above the ramming surface 14 inside the infiltrator tip 4, so as to cooperate with the infrared transmitting tube 25 and infrared receiving tube 26 in the central part of the lifting coil 13 for calculating an end movement velocity of the rammer before ramming occurs while monitoring and recording the ramming time of the rammer 15. In addition, a group of infrared transmitting tube 25 and infrared receiving tube 26 is provided at a position slightly downward from the upper outlet end of the positioning coil 22, and the infrared receiving tube 26 is unable to receive an optical signal due to the blockage of the rammer 15 when the rammer 15 is in a stationary state in the positioning coil 22.

The length of the rammer 15 is equal to the respective length of the lifting coil 13, the first accelerating coil 18, the second accelerating coil 19, the third accelerating coil 20, the fourth accelerating coil 21 and the positioning coil 22. In the present invention, the lifting coil, the accelerating coil, and the positioning coil can drive the rammer to strike the cushion to pull the infiltrator out of the star soil, so that the infiltrator can be used repeatedly many times.

Figure 7:
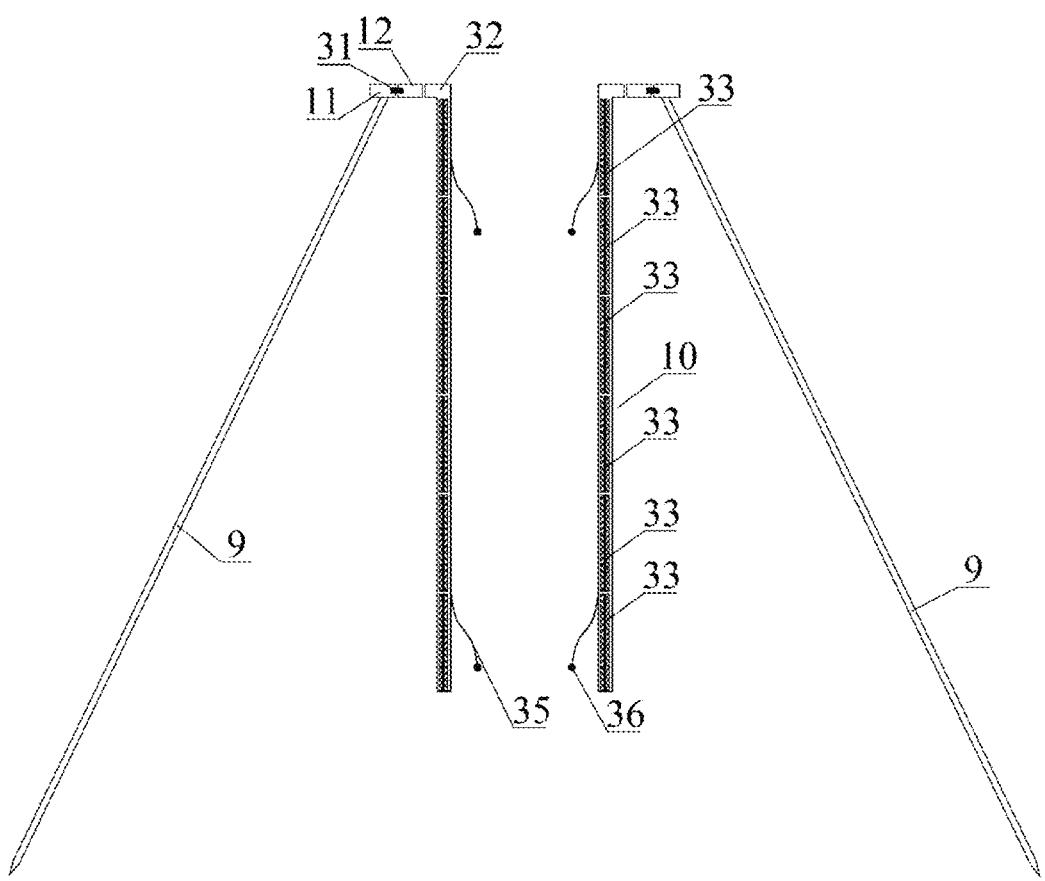
FIG. 7 is a structural schematic diagram of the limiting sleeve.

As shown in FIG. 3, legs 9 of the infiltrator bracket 2 are fixed to the lower part of the bracket flange 11, the bracket flange 11 is connected to the leveling ring 12 through a first group of two leveling shafts 31 on the same axis. As shown in FIGS. 3 and 7, in the direction perpendicular to the axes of the two leveling shafts 31 between the bracket flange 11 and the leveling ring 12, the leveling ring 12 is connected to the limiting ring 32 of the limiting sleeve 10 through a second group of leveling shafts 31. Both the first group of leveling shafts 31 and the second group of leveling shafts 31 are composed of two identical solid steel cylinders on the same axis. In the present invention, the leveling structure of the infiltrator bracket 2 ensures that infiltrator 1 remains in a vertical state in the limiting sleeve 10 when the infiltration device is located on an inclined ground. The bracket flange 11 may also be connected directly to the limiting sleeve 10.

Also as shown in FIG. 3, a plurality of displacement solenoid coils 33 are provided at the lower part of the limiting sleeve 10, and the outer surface of the infiltrator power part 5 is an armature tube 16 made of soft magnetic material, which together with the plurality of solenoid coils 33 in the limiting sleeve 10 forms a differential displacement sensor 34. The upper part of the main body of the limiting sleeve 10 is the limiting ring 32 and the lower part is the plurality of displacement solenoid coils 33. When the infiltrator 1 is arranged in the limiting sleeve, the outer surface of the infiltrator power part 5, i.e., the armature tube 16 made of soft magnetic material, together with the plurality of solenoid coils 33 in the limiting sleeve 10, forms a differential displacement sensor 34. In the present invention, six groups of displacement solenoid coil 33 are used to form a differential displacement sensor 34 to monitor the vertical displacement of the infiltrator 1. The limiting sleeve 10 fixes the infiltrator 1 by means of eight limiting reeds 35 therein, of which four limiting reeds 35 are arranged at the upper part of the limiting sleeve 10 and four limiting reeds 35 are arranged at the lower part of the limiting sleeve 10. In the original state, on the outside of the infiltrator power part 5, the limiting bearing 36 at the end of the limiting reed 35 is embedded in a limiting groove 17 in the armature tube 16.

Figure 6:
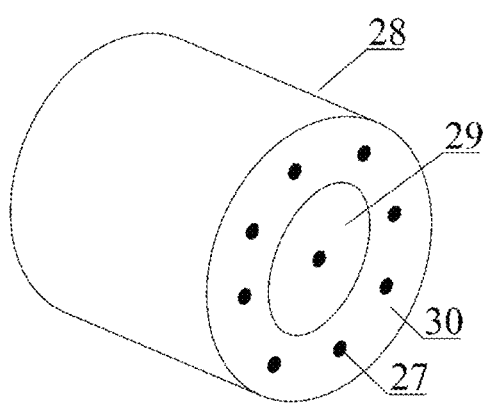
FIG. 6 is a structural schematic diagram of the star soil thermal parameter tester.

As shown in FIG. 6, a thermocouple temperature sensor 27 is provided outside the infiltrator 1, and a star soil thermal parameter tester 28 is provided on the infiltrator tip 4. The star soil thermal parameter tester has a circular heat generating plate 29 provided with a thermocouple temperature sensor 27 in its central portion, and a circular heat receiving plate 30 provided with a plurality of thermocouple temperature sensors 27 in its surrounding area.

In practice, the process for controlling a rammer 15 to move upward in the coils is as follows. In the initial state, there is no current in the coils, at which time the rammer 15 is in a bottomed-out state under the effect of gravity. In the corresponding state, the end of the rammer 15 is in an equal height position with an infrared receiving tube 26 and an infrared transmitting tube 25 in the middle of the lifting coil 13, and the corresponding infrared receiving tube 26 can receive an optical signal from the infrared transmitting tube 25. In order to move the rammer 15 upwardly, a small current is applied to the lifting coil 13 so that the rammer 15 moves upwardly at a smaller velocity, and the current in the lifting coil 13 is turned off when an infrared receiving tube 26 in the middle of the lifting coil 13 fails to receive an optical signal due to the blockage of the hammer 15. Subsequently, the current of the first accelerating coil 18 is turned on, and at that time the rammer 15 approaches the first accelerating coil 18 under the effect of inertia and moves upwardly under the effect of magnetic attraction generated by the first accelerating coil 18; when an infrared receiving tube 26 disposed in the middle of the first accelerating coil 18 fails to receive an optical signal, the current in the first accelerating coil 18 is turned off while the current in the second accelerating coil 19 is turned on, and at that time the rammer 15 approaches second accelerating coil 19 under the effect of inertia and moves upwardly under the effect of magnetic attraction generated by the second accelerating coil 19; when an infrared receiving tube 26 disposed in the middle of the second accelerating coil 19 fails to receive an optical signal, the current in the second accelerating coil 19 is turned off while the current in the third accelerating coil 20 is turned on, and at that time the rammer 15 approaches the third accelerating coil 20 under the effect of inertia and moves upwardly under the effect of magnetic attraction generated by the third accelerating coil 20; when an infrared receiving tube 26 disposed in the middle of the third accelerating coil 20 fails to receive an optical signal, the current in the third accelerating coil 20 is turned off while the current in the fourth accelerating coil 21 is turned on, and at that time the rammer 15 approaches the fourth accelerating coil 21 under the effect of inertia and moves upwardly under the effect of magnetic attraction generated by the fourth accelerating coil 21; when an infrared receiving tube 26 disposed in the middle of the fourth accelerating coil 21 fails to receive an optical signal, the current in the fourth accelerating coil 21 is turned off, and at that time the rammer 15 approaches the positioning coil 22 under the effect of inertia. In order to facilitate easier capturing of the rammer 15 by the positioning coil 22, the current should be turned on until the infrared receiving tube 26 disposed in the middle of the positioning coil 22 no longer receives an optical signal. As a result, the rammer 15 oscillates, occasionally striking the cushion 24 in the positioning coil 22 and eventually coming to a stationary state. In order to minimize the ramming force that the rammer 15 gives to the cushion 24 at the end of its upward movement, it is preferred to apply a gradually decreasing current strength to the lifting coil 13, the first accelerating coil 18, the second accelerating coil 19, the third accelerating coil 20 and the fourth accelerating coil 21, while applying a larger current to the positioning coil 22.

Moreover, the following method can be used for penetrating the infiltrator 1 into the star soil. That is, the rammer 15 is placed in the positioning coil 22 in the initial state, and a current is applied to the fourth accelerating coil 21 while the current in the positioning coil 22 is turned off, at that time the rammer 15 accelerates downwardly under the effects of gravity and electromagnetic attraction of the fourth accelerating coil 21. When an infrared receiving tube 26 disposed in the middle of the fourth accelerating coil 21 fails to receive an optical signal due to the blockage of the rammer 15, the current in the fourth accelerating coil 21 is turned off while a current is applied to the third accelerating coil 20, and at that time the rammer 15 accelerates downwardly under the effects of gravity and electromagnetic attraction of the third accelerating coil 20; when an infrared receiving tube 26 disposed in the middle of the third accelerating coil 20 fails to receive an optical signal due to the blockage of the rammer 15, the current in the third accelerating coil 20 is turned off while a current is applied to the second accelerating coil 19, and at that time the rammer 15 accelerates downwardly under the effects of gravity and electromagnetic attraction of the second accelerating coil 19; when an infrared receiving tube 26 disposed in the middle of the second accelerating coil 19 fails to receive an optical signal due to the blockage of the rammer 15, the current in the second accelerating coil 19 is turned off while a current is applied to the first accelerating coil 18, and at that time the rammer 15 accelerates downwardly under the effects of gravity and electromagnetic attraction of the first accelerating coil 18; when an infrared receiving tube 26 disposed in the middle of the first accelerating coil 18 fails to receive an optical signal due to the blockage of the rammer 15, the current in the First accelerating coil 18 is turned off while a current is applied to the lifting coil 13, and at that time the rammer 15 accelerates downwardly under the effects of gravity and electromagnetic attraction of the lifting coil 13; when an infrared receiving tube 26 disposed in the middle of the lifting coil 13 fails to receive an optical signal due to the blockage of the rammer 15, the current in the lifting coil 13 is turned off, and at that time the rammer 15 continues to move downward under the effect of inertia and strikes the ramming surface 14, thereby driving the infiltrator 1 to penetrate the star soil layer. Here, by sequentially controlling the current values supplied to the fourth accelerating coil 21, the third accelerating coil 20, the second accelerating coil 19, the first accelerating coil 18 and the lifting coil 13, it is possible to control the magnetic attraction strength of the coils to the rammer 15 and thereby adjust the movement velocity of the rammer 15 before ramming occurs. As shown in Impulse Equation $$F = \frac{mv}{t_0},$$

the impact force of the rammer 15 on the infiltrator 1 is related to the velocity of the rammer 15, based on which the control of the impact force of the rammer 15 is ultimately realized. Furthermore, the impact frequency of the rammer 15 can be controlled by controlling the releasing time interval of the rammer 15.

The infiltrator 1 is penetrated into the star soil layer, so that a thermocouple temperature sensor 27 disposed on the outer surface of the infiltrator power part 5 is in contact with the star soil. As a result, the temperature of the star soil at a corresponding depth can be monitored in real-time by the thermocouple temperature sensor 27 in contact with the star soil.

Once the infiltrator tip 4 enters the star soil layer, a star soil thermal parameter tester 28 is in close contact with the star soil, thereby allowing the star soil thermal parameters to be tested. Specifically, a current is applied to the heat generating plate 29 of the star soil thermal parameter tester 28 to heat the star soil in contact therewith, and the star soil temperature is measured by the heat receiving plate 30. By varying the form of heat applied to the star soil by the heat generating plate 29, various thermal parameters of the star soil can be measured. In addition to star soil temperature sensors, the infiltrator 1 may also be equipped with a thermal conductivity tester to monitor the temperature of the deep star soil in real time. The thermal conductivity tester can be penetrated with the infiltrator 1 to measure the star soil at different depths. In addition, the infiltrator 1 may also be equipped with other sensors, and the present invention has no special limitation on the equipped sensors.

The process of pulling the infiltrator 1 up from the star soil is similar to the process of controlling the upward movement of the rammer 15, at which time the rammer 15 also strikes the cushion 24. For example, when infiltrator 1 is pulled up from the star soil, a part of the infiltrator 1 would still be in the limiting sleeve 10 and therefore, by controlling the current strength to control the striking force of the rammer on the cushion 24, it would be possible to re-embed the limiting bearing 36 at the end of the limiting reed 35 in the limiting groove 17 on the armature tube 16 on the outside of the infiltrator power part 5 after the infiltrator 1 has been pulled out of the star soil, so as to achieve the effect of repeated use of the infiltrator 1 for many times.

In the present invention, by using the mechanism of attracting the rammer 15 towards the solenoid coil's center upon energization of the coil, the solenoid coil is energized to generate a magnetic attracting force to accelerate the upward-lifting or downward movement of the rammer 15. When the rammer 15 is lifted, a small current is used to make the rammer 15 move at a smaller velocity so that the rammer 15 does not produce an upward impact force on the infiltrator 1. On the other hand, when the rammer 15 moves downwardly under gravitational acceleration and electromagnetic attraction, it will exert a downward impact force on the infiltrator 1, thereby driving the infiltrator 1 to penetrate the star soil.

In the present invention, the on-off control of the current in an accelerating coil is performed by the infrared receiving tubes 26 and the infrared transmitting tubes 25 arranged in each of the accelerating coils, and the magnetic attraction of the accelerating coil on the rammer 15 is controlled by controlling the current strength in the accelerating coils, thereby controlling the end movement velocity of the rammer 15 and ultimately controlling the impact force of the rammer 15 on the infiltrator 1. Moreover, the penetration amount of the infiltrator 1 driven by each impact is measured and recorded by using a differential displacement sensor 34 composed of a displacement solenoid coil group in the limiting sleeve 10 and an armature tube 16 in the power part of the infiltrator 1. Furthermore, the penetration resistance of the infiltrator 1 at each strike is derived from the impact force data of the infiltrator 1 and the displacement data measured by the differential displacement sensor 34, and the softness degree of the star soil is evaluated from the penetration resistance data. In addition, the gravitational acceleration value of the planet is measured by a free-fall test of the rammer 15 in the conducting pipe 23 under extremely low friction and vacuum.

On the basis of the above configuration and operation, the present invention provides a method of measuring the gravitational acceleration of a star, which specifically comprises the following steps a to b.

In step a, after the star infiltration device is placed on the star, the rammer 15 in a bottomed-out state is lifted into the positioning coil 22. Specifically, a current is supplied to the lifting coil 13 to move the rammer 15 upward, wherein when the position sensor I in the middle of the lifting coil 13 is triggered, the current in the lifting coil 13 is turned off while the current in the first accelerating coil 18 is turned on, at which time the rammer 15 approaches the first accelerating coil 18 and continues to move upward; when the position sensor I in the middle of the first accelerating coil 18 is triggered, the current in the first accelerating coil 18 is turned off while the current in the second accelerating coil 19 is turned on, at which time the rammer 15 approaches the second accelerating coil 19 and moves upward; when the position sensor I in the middle of the second accelerating coil 19 is triggered, the current in the second accelerating coil 19 is turned off while the current in the third accelerating coil 20 is turned on, at which time the rammer 15 approaches the third accelerating coil 20 and moves upward; when the position sensor I in the middle of the third accelerating coil 20 is triggered, the current in the third accelerating coil 20 is turned off and the current in the fourth accelerating coil 21 is turned on, at which time the rammer 15 approaches the fourth accelerating coil 21 and moves upward; when the position sensor I in the middle of the fourth accelerating coil 21 is triggered, the current in the fourth accelerating coil 21 is turned off, at which time the rammer 15 approaches the positioning coil 22; when the position sensor I in the middle of the positioning coil 22 is triggered, a current is applied to the positioning coil 22 so that finally the rammer 15 is stationary in the positioning coil 22 and the position sensor III at the upper outlet end of the positioning coil 22 is triggered.

In step b, the current in the positioning coil 22 is turned off, and no current is applied to the fourth accelerating coil 21, the third accelerating coil 20, the second accelerating coil 19, the first accelerating coil 18 and the lifting coil 13, so that the rammer 15 is subjected to undergo a free-fall motion, at which time the end time of the period during which the position sensor III at the upper outlet end of the positioning coil 22 is triggered and the end time of the period during which the position sensor I in the middle of the lifting coil 13 is triggered are recorded. Consequently, the time of the rammer's free-fall motion is calculated and recorded as t. Since the movement displacement h of the rammer 15 from the positioning coil 22 to the bottom is constant, Equation $$h = v_0 t + \frac{1}{2} g t^2$$

can be obtained, where v0 is the initial velocity of the rammer 15 and v0=0 in the measurement, which results in the gravitational acceleration as shown in Equation $$g = \frac{2h}{t^2}.$$

In the above-described method, once the rammer 15 is lifted into the positioning coil 22, the current in the positioning coil 22 is turned off and no current is applied to the fourth accelerating coil 21, the third accelerating coil 20, the second accelerating coil 19, the first accelerating coil 18 and the lifting coil 13, so that the rammer 15 undergoes a free-fall motion. Furthermore, the time at which the infrared receiving tube 26 at the upper outlet end of the positioning coil 22 receives an optical signal and the time at which the infrared receiving tube 26 in the middle of the lifting coil 13 receives an optical signal again after experiencing a brief period without any optical signal are recorded, thereby calculating the time of the rammer's free-fall motion, and recording it as t. Since the movement displacement h of the rammer from the positioning coil to the bottom is constant, Equation $$h = v_0 t + \frac{1}{2} g t^2$$

can be obtained, where v0 is the initial velocity of the rammer 15 and v0=0 in the measurement, which results in the gravitational acceleration as shown in Equation $$g = \frac{2h}{t^2}.$$

To minimize the measuring error, it is possible to perform several measurements repeatedly to obtain the average value. In addition, since the conducting pipe 23 in which the rammer 15 moves has a groove structure and is in a vacuum state, both the air resistance and the sliding frictional resistance to which the rammer 15 is subjected are negligible. Therefore, the planetary gravitational acceleration value g measured by the probe is relatively accurate.

Based on the method of measuring the gravitational acceleration of a star, the present invention also provides a method of measuring the subgrade-bearing capacity of a star, which comprises the following steps 1 to 4.

In step 1, an infiltrator bracket 2 equipped with infiltrator 1 is placed on the planetary surface, and once the infiltrator 1 is stationary, the gravitational acceleration is measured by the above method of measuring the gravitational acceleration of a star.

In step 2, the rammer 15 is lifted into the positioning coil 22 again, and the rammer 15 is released and a current is sequentially applied to the fourth accelerating coil 21, the third accelerating coil 20, the second accelerating coil 19, the first accelerating coil 18 and the lifting coil 13 in accordance with the measured value of the gravitational acceleration to accelerate the downward movement of the rammer 15. As a result, the rammer 15 strikes the ramming surface 14, which in turn causes the infiltrator 1 to move downward. When the rammer 15 strikes the ramming surface 14, the bearing 36 at the end of the limiting reed 35 is disengaged from the limiting groove 17 and the infiltrator cone part 3 at the lower end of the infiltrator 1 comes into contact with the star soil to be measured.

In step 3, the rammer 15 is continuously lifted into the positioning coil 22, and the rammer 15 is controlled to accelerate downward to strike the ramming surface 14. An end movement velocity v of the rammer before striking is calculated by recording the time at which the rammer 15 triggers the position sensor I in the middle of the lifting coil 13 and the time at which the position sensor II at a position above the ramming surface 14 is triggered, then the impact energy is obtained as shown in $$W = \frac{1}{2} m v^2$$

for the rammer 15 having a mass of m. Meanwhile, the displacement 1 corresponding to each striking action is measured and recorded by using a differential displacement sensor 34 composed of an armature tube 16 made of soft magnetic material on the outer surface of the infiltrator power part 5 and a plurality group of displacement solenoid coils 33 in the limiting sleeve 10.

In step 4, the procedure of step 3 is repeated to plot the relationship curve between the impact energy and the displacement for each rammer 15. Then, the dynamic penetration resistance of a star soil is calculated by Equation $$q_d = \frac{m v^2}{2 A l}$$

where $q_d$ is the value of the dynamic penetration resistance, m is the mass of the rammer 15, v is the end movement velocity of the rammer 15, A is the cross-sectional area of the infiltrator tip 4, and l is the displacement of the infiltrator 1 penetrating the star soil corresponding to each strike, and thus the subgrade bearing performance of the star soil is determined and evaluated.

The above are only exemplary embodiments of the present invention. According to yet another embodiment of the present invention, the infiltration device can also serve as a planetary in-situ probe for in-situ measurement of the gravitational acceleration value of a planet. In addition, the infiltration device can be used to evaluate the subgrade bearing performance of the star soil in situ and to study the sedimentary history of the star soil based on the penetration resistance data of the infiltrator. In this way, the planetary geological history can be revealed from the perspective of the sedimentary history of the star soil. According to some embodiments of the present invention, it is also possible to deploy several infiltration devices in an array in an area of the planetary surface to obtain information about the soil-bearing, thermal and geothermal properties of the start soil in the corresponding region, or to conduct a study of the sedimentary history of the star soil in the corresponding region. Furthermore, according to some embodiments of the present invention, the infiltration device can be used under unmanned conditions on the planetary surface, i.e., the infiltration device is placed on the planetary surface by a robotic arm mounted on the lander and connected to the electric power and data acquisition terminals, which can be operated to fulfil the engineering application scenarios under the conditions of landing without astronauts in the initial stage of planetary exploration.

What is claimed is:

1. A star infiltration device comprising an infiltrator, and a rammer being provided inside the infiltrator, characterized in that the infiltrator sequentially comprises, in order from bottom to top, an infiltrator cone part, an infiltrator tip, an infiltrator power part and an upper plug;

a conducting pipe is provided inside the infiltrator, and the rammer is disposed in an inner part of the conducting pipe, a ramming surface is provided at a bottom of the conducting pipe inside the infiltrator tip, and a lifting coil is provided in an inner part of the infiltrator tip;

a distance from a lower end face of the lifting coil to a lowest point of the ramming surface in the inner part of the infiltrator tip is half a length of the rammer, and accelerating coils and a positioning coil are provided in an inner part of the infiltrator power part in order from bottom to top, wherein the accelerating coils comprise a plurality of groups, and a distance from an upper outlet end of the positioning coil to a cushion is half the length of the rammer;

the lifting coil, the accelerating coils and the positioning coil are all disposed on an outside of the conducting pipe, a position sensor I for detecting a position of the rammer is provided in both a central part of the lifting coil, the positioning coil and each accelerating coil, a position sensor II for detecting the position of the rammer is provided at a position above the ramming surface inside the infiltrator tip, and a position sensor III for detecting the position of the rammer is provided at a position at the upper outlet end of the positioning coil;

the infiltrator is connected to an infiltrator bracket, the infiltrator bracket comprises three legs, a limiting sleeve, a bracket flange and a leveling ring, the legs are fixed to a lower part of the bracket flange, the bracket flange and the leveling ring are connected to each other by a first group of two leveling shafts on the same axis, the limiting sleeve is provided with a limiting ring at an upper end, and the leveling ring is connected to the limiting ring by a second group of leveling shafts, an axial direction of the second group of leveling shafts is in a direction perpendicular to an axis of the first group of leveling shafts, the infiltrator is arranged in the limiting sleeve, and a plurality of limiting reeds are provided in the limiting sleeve, the plurality of limiting reeds are provided at equal intervals along the circumferential and axial directions of the limiting sleeve, a bearing is provided at an end of the limiting reeds, and a limiting groove is provided outside the infiltrator, while the bearing is disposed inside the limiting groove at a corresponding position, wherein a plurality group of displacement solenoid coils are provided at a lower part of the limiting sleeve, and an outer surface of the infiltrator power part is an armature tube made of soft magnetic material, which forms a differential displacement sensor together with the plurality group of displacement solenoid coils in the limiting sleeve.

2. The star infiltration device according to claim 1, wherein the accelerating coils comprise a first accelerating coil, a second accelerating coil, a third accelerating coil and a fourth accelerating coil.

3. The star infiltration device according to claim 2, wherein a thermocouple temperature sensor is provided outside the infiltrator, and a star soil thermal parameter tester is provided at the infiltrator tip;

a central part of the star soil thermal parameter tester is a circular heat generating plate equipped with a thermocouple temperature sensor, and the surrounding area is a circular heat receiving plate equipped with a plurality of thermocouple temperature sensors.

4. The star infiltration device according to claim 2, wherein the position sensor I, the position sensor II and the position sensor III are all an infrared sensor comprising an infrared transmitting tube and an infrared receiving tube.

5. The star infiltration device according to claim 2, wherein a groove structure is provided in the inner part of the conducting pipe.

6. A method of measuring a gravitational acceleration of a star, wherein the measuring the gravitational acceleration of the star with the star infiltration device of claim 2 comprises the steps of step a: after the star infiltration device is placed on the star, lifting the rammer in a bottomed-out state into the positioning coil, specifically, applying a current to the lifting coil to move the rammer upward, wherein when the position sensor I in the middle of the lifting coil is triggered, turning off the current in the lifting coil and turning on the current in the first accelerating coil, at which time the rammer approaches the first accelerating coil and continues to move upward, when the position sensor I in the middle of the first accelerating coil is triggered, turning off the current in the first accelerating coil and turning on the current in the second accelerating coil, at which time the rammer approaches the second accelerating coil and moves upward, when the position sensor I in the middle of the second accelerating coil is triggered, turning off the current in the second accelerating coil and turning on the current in the third accelerating coil, at which time the rammer approaches the third accelerating coil and moves upward, when the position sensor I in the middle of the third accelerating coil is triggered, turning off the current in the third accelerating coil and turning on the current in the fourth accelerating coil, at which time the rammer approaches the fourth accelerating coil and moves upward, when the position sensor I in the middle of the fourth accelerating coil is triggered, turning off the current in the fourth accelerating coil, at which time the rammer approaches the positioning coil, when the position sensor I in the middle of the positioning coil is triggered, applying a current to the positioning coil, so that finally the rammer is stationary in the positioning coil and the position sensor III at the upper outlet end of the positioning coil is triggered; and step b: turning off the current in the positioning coil and refraining from applying current to the fourth accelerating coil, the third accelerating coil, the second accelerating coil, the first accelerating coil and the lifting coil so as to cause the rammer to undergo a free-fall motion, at which time an end time of the period during which the position sensor III at the upper outlet end of the positioning coil is triggered and an end time of the period during which the position sensor I in the middle of the lifting coil is triggered are recorded, thereby calculating a time of the rammer's free-fall motion and recording the time as t, since a movement displacement h of the rammer from the positioning coil to the bottoming out is constant, Equation $$h = v_0 t + \frac{1}{2} g t^2$$

is obtained in which v0 is the initial velocity of the rammer and v0=0 in the measurement, thus the gravitational acceleration is calculated by Equation $$g = \frac{2h}{t^2}.$$

7. A method of measuring a soil-bearing capacity of a star, wherein the measuring the soil-bearing capacity of the star with the star infiltration device of claim 2 comprises the steps of step 1: placing the infiltrator bracket equipped with the infiltrator on a planetary surface, once the infiltrator is stationary, lifting the rammer in a bottomed-out state into the positioning coil, specifically, applying a current to the lifting coil to move the rammer upward, wherein when the position sensor I in the middle of the lifting coil is triggered, turning off the current in the lifting coil and turning on the current in the first accelerating coil, at which time the rammer approaches the first accelerating coil and continues to move upward, when the position sensor I in the middle of the first accelerating coil is triggered, turning off the current in the first accelerating coil and turning on the current in the second accelerating coil, at which time the rammer approaches the second accelerating coil and moves upward, when the position sensor I in the middle of the second accelerating coil is triggered, turning off the current in the second accelerating coil and turning on the current in the third accelerating coil, at which time the rammer approaches the third accelerating coil and moves upward, when the position sensor I in the middle of the third accelerating coil is triggered, turning off the current in the third accelerating coil and turning on the current in the fourth accelerating coil, at which time the rammer approaches the fourth accelerating coil and moves upward, when the position sensor I in the middle of the fourth accelerating coil is triggered, turning off the current in the fourth accelerating coil, at which time the rammer approaches the positioning coil, when the position sensor I in the middle of the positioning coil is triggered, applying a current to the positioning coil, so that finally the rammer is stationary in the positioning coil and the position sensor III at the upper outlet end of the positioning coil is triggered;

step 2: turning off the current in the positioning coil and refraining from applying the current to the fourth accelerating coil, the third accelerating coil, the second accelerating coil, the first accelerating coil and the lifting coil so as to cause the rammer to undergo a free-fall motion, at which time an end time of the period during which the position sensor III at the upper outlet end of the positioning coil is triggered and an end time of the period during which the position sensor I in the middle of the lifting coil is triggered are recorded, thereby calculating the time of the rammer's free-fall motion and recording the time as t, since a movement displacement h of the rammer from the positioning coil to the bottoming out is constant, Equation $$h = v_0 t + \frac{1}{2} g t^2$$

is obtained in which v0 is the initial velocity of the rammer and v0=0 in the measurement, thus a gravitational acceleration is calculated by Equation $$g = \frac{2h}{t^2};$$

step 3: lifting the rammer to the positioning coil again, releasing the rammer and sequentially applying current to the fourth accelerating coil, the third accelerating coil, the second accelerating coil, the first accelerating coil and the lifting coil in accordance with a measured value of the gravitational acceleration to accelerate a downward movement of the rammer, and finally causing the rammer to strike the ramming surface to allow the infiltrator to move downward, wherein when the rammer strikes the ramming surface, the bearing at the end of the limiting reeds is disengaged from the limiting groove and the infiltrator cone part at a lower end of the infiltrator comes into contact with the star soil to be measured;

step 4: continuously lifting the rammer to the positioning coil, controlling the rammer to accelerate downward to strike the ramming surface, and recording a time at which the rammer triggers the position sensor I in the middle of the lifting coil and a time at which the position sensor II at a position above the ramming surface is triggered to calculate an end movement velocity v of the rammer before striking, so that an impact energy of the rammer with a mass m is obtained as shown in $$W = \frac{1}{2} m v^2,$$

then measuring and recording a displacement l corresponding to each striking action using a differential displacement sensor composed of an armature tube made of soft magnetic material on an outer surface of the infiltrator power part and a plurality group of displacement solenoid coils in the limiting sleeve; and step 5: repeating step 4 and plotting a relationship curve between the impact energy and the displacement for each rammer, then calculating a dynamic penetration resistance of a star soil by Equation $$q_d = \frac{m v^2}{2 A l}$$

where $q_d$ is a value of the dynamic penetration resistance, m is a mass of the rammer, v is the end movement velocity of the rammer, A is a cross-sectional area of the infiltrator tip, and/is the displacement of the infiltrator penetrating the star soil corresponding to each strike, thereby determining and evaluating a subgrade bearing performance of the star soil.

* * * * *